United States Patent

[11] 3,615,199

| [72] | Inventors | Jack D. Terrana<br>Tampa;<br>Leo A. Miller, Lakeland, both of Fla. |
|---|---|---|
| [21] | Appl. No. | 681,661 |
| [22] | Filed | Nov. 9, 1967 |
| [45] | Patented | Oct. 26, 1971 |
| [73] | Assignee | Wellman-Lord, Inc.<br>Lakeland, Fla.<br>Continuation-in-part of application Ser. No. 594,431, Nov. 15, 1966, now abandoned, and a continuation-in-part of 616,682, Feb. 16, 1967, now abandoned. |

[54] PROCESS AND APPARATUS FOR PURIFYING GAS
17 Claims, 4 Drawing Figs.

[52] U.S. Cl. ........................................... 23/178,
  23/2, 23/261, 23/283, 55/260, 261/114
[51] Int. Cl. ........................................... C01b 17/60,
  C01b 17/48
[50] Field of Search ........................................... 23/3, 178,
  119, 260, 2, 261, 283, 302; 55/259–260; 261/114

[56] References Cited
UNITED STATES PATENTS

| 1,294,546 | 2/1919 | Sherwin .......................... | 23/260 |
|---|---|---|---|
| 1,589,133 | 6/1926 | Eustis ............................ | 23/178 |
| 2,884,304 | 3/1959 | Grosskinsky et al. .......... | 23/3 |
| 2,895,800 | 7/1959 | Otto .............................. | 23/119 |
| 1,619,029 | 3/1927 | Morris ........................... | 261/97 |
| 2,772,081 | 11/1956 | Hibshman ...................... | 261/114 |
| 2,923,533 | 2/1960 | Berry ............................. | 261/110 |
| 3,268,296 | 8/1966 | Hall et al. ...................... | 55/85 |
| 3,320,906 | 5/1967 | Domahidy ...................... | 23/178 X |
| 3,353,799 | 11/1967 | Lions et al. .................... | 261/117 |

FOREIGN PATENTS

| 134,555 | 11/1919 | England ......................... | 23/178 S |

OTHER REFERENCES

Chertkov, Chem. Abstracts, vol. 55, p. 17116e (9–1961)
Perry, Chem. Engr. Handbook, 4th edit. (McGraw-Hill 1963) (sect. 14, pp. 2, 37; sect. 18, pp. 12, 25, 26, 53, 86; sect. 20, p.82)
Perry, Chem. Engrs. Handbook, 4th edit. McGraw-Hill 1963) sect. 14, pp 24, 27, 30– 33)

Primary Examiner—Oscar R. Vertiz
Assistant Examiner—Charles B. Rodman
Attorneys—Morton, Bernard, Brown, Roberts & Sutherland, John W. Behringer, Eugene L. Bernard, Martin J. Brown, James N. Dresser, W. Brown Morton, Jr., John T. Roberts and Malcolm L. Sutherland ABSTRACT: Apparatus and process for preventing plugging of a reactor used in a system involving reaction between components, e.g. $SO_2$, in a gas and a salt solution, e.g. a sulfite solution which is close to its saturation point, while avoiding substantial dilution of the sulfite solution to produce a spent bisulfite solution from which the bisulfite is subsequently separated and decomposed to release sulfur dioxide. Examples of sulfites include potassium, cesium, or rubidium sulfites. The apparatus includes a reaction zone having at least one, or more contact trays which are sprayed from beneath with the aqueous salt solution, e.g. sulfite solution. An entrainment zone above the trays can be used to advantage and this involves a woven mesh contact material which is sprayed from both sides with the salt solution to remove entrained materials from the gas leaving the reactor. Also, particulate solid or liquid-soluble gaseous contaminants can be removed from the gas before contacting it with the sulfite solution by contacting it with a fluid-permeable, impingement target in the presence of a concurrently flowing liquid stream which is also contacting the target. It is desirable to prevent plugging of the gas inlet opening to the reactor by using a bonnet arranged over the gas inlet opening.

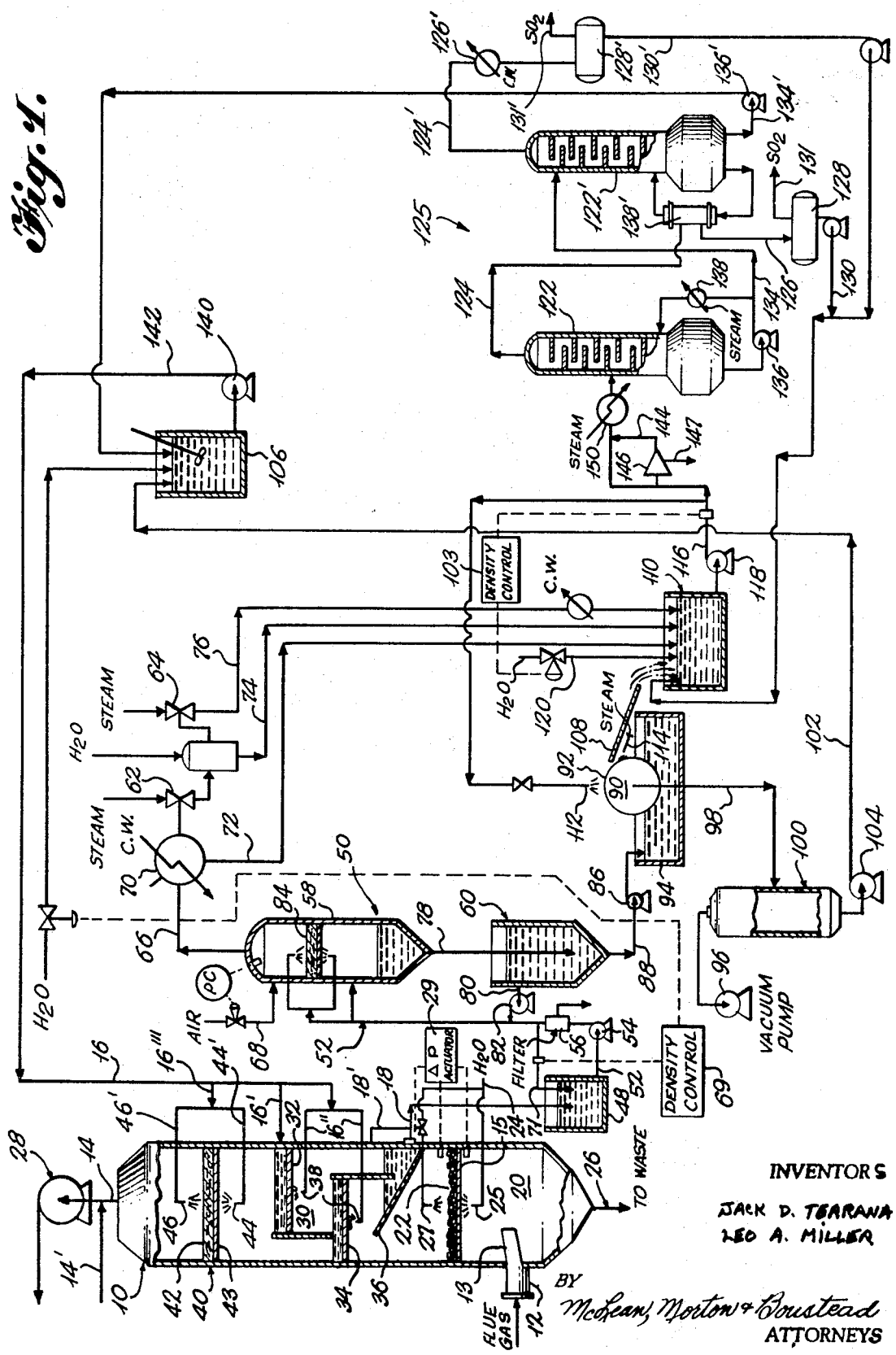

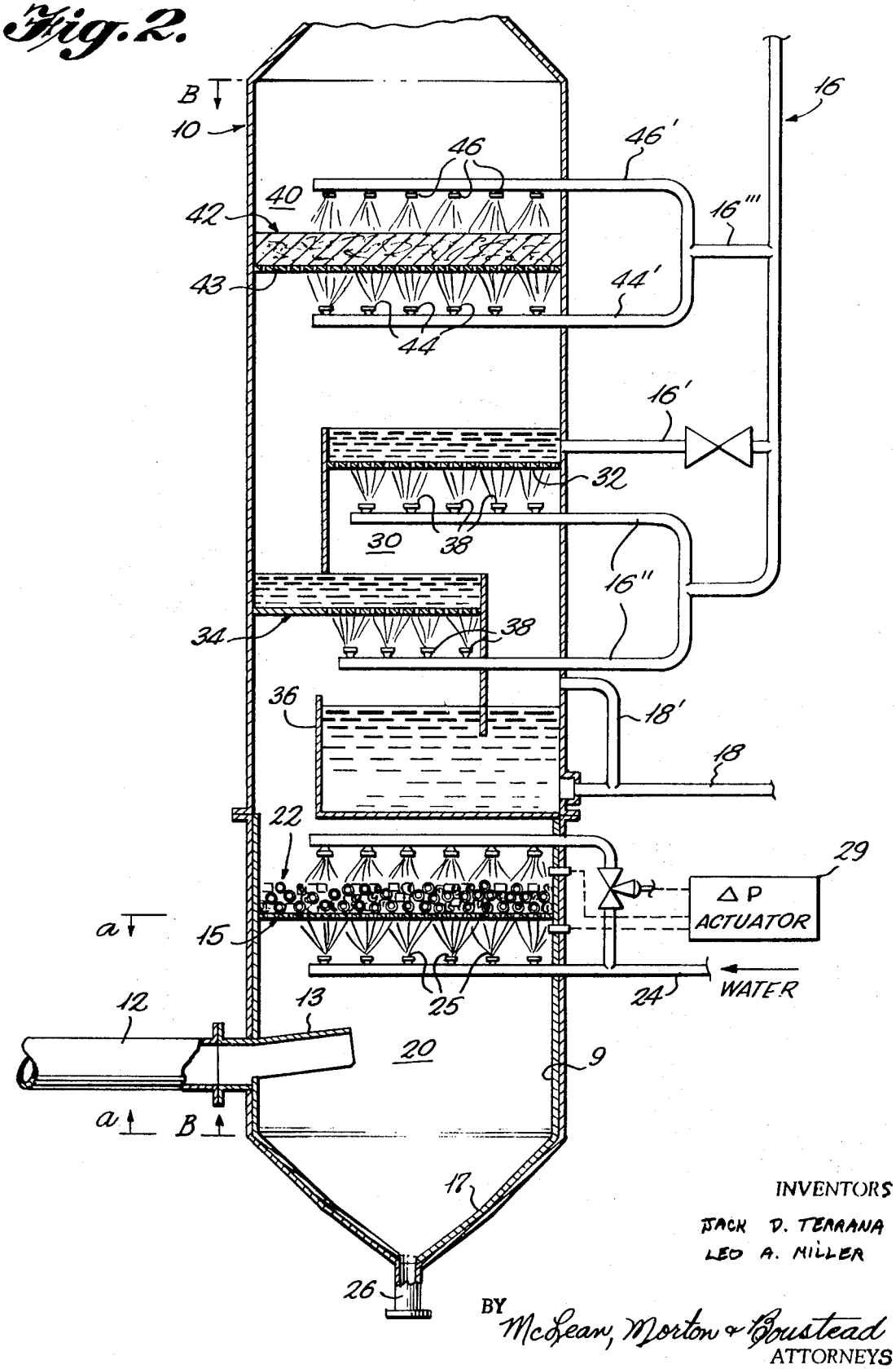

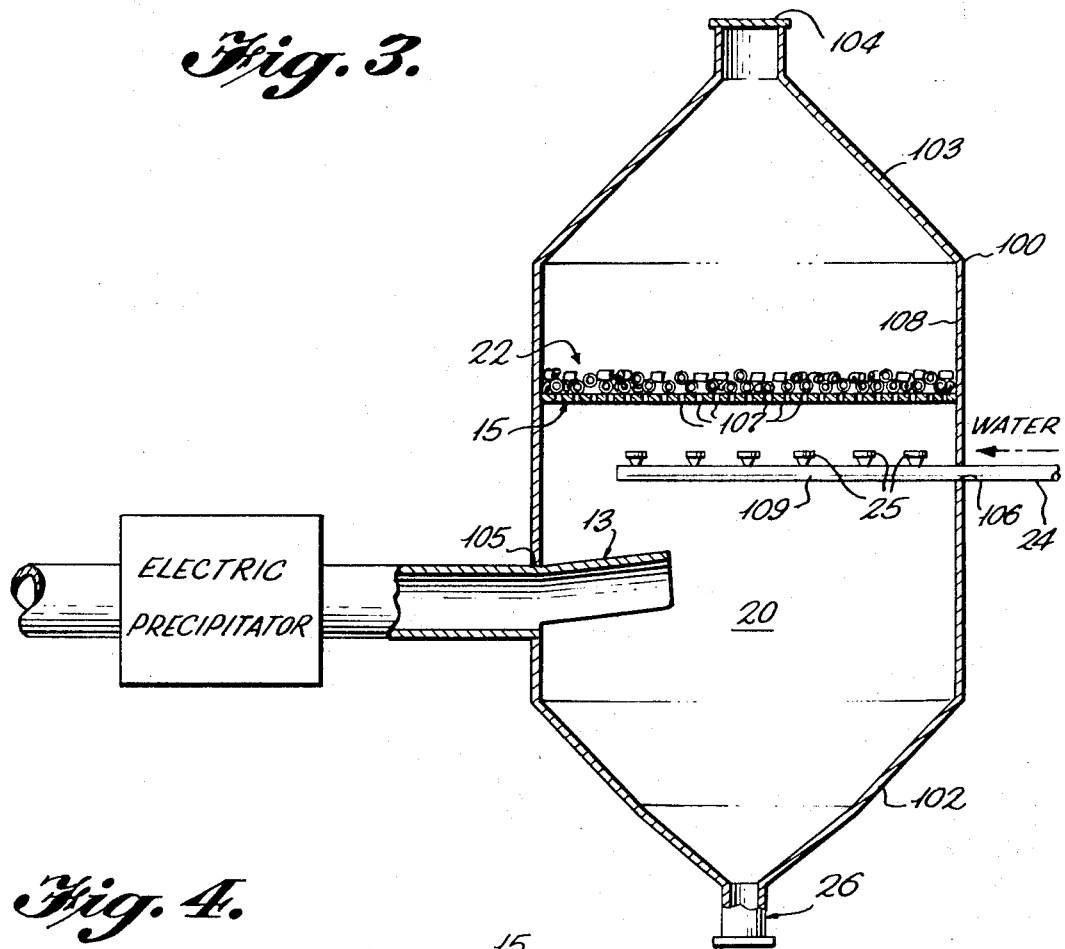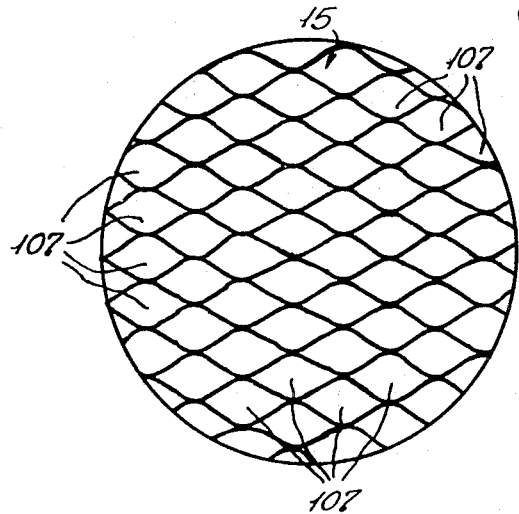

PROCESS AND APPARATUS FOR PURIFYING GAS

This application is a continuation-in-part of application Ser. No. 594,431 filed Nov. 15, 1966 now abandoned, and application Ser. No. 616,681 filed Feb. 16, 1967, also now abandoned.

This invention relates to a process and apparatus for carrying out reaction between a gas and a salt solution, e.g. a salt solution close to its saturation point, and more particularly, to a reactor for carrying out this reaction which includes contact trays sprayed from beneath, advantageously with the salt solution In accordance with other embodiments, the reactor also can include an entrainment zone above the reaction zone having woven mesh contact material which is sprayed from both sides, advantageously with the salt solution, for removing entrained materials from the gases exiting from the reactor and, can also include apparatus for scrubbing the gas to remove particulate solid and liquid-soluble contaminants before introducing the gas into the reactor.

Many reactions are carried out between gases, e.g. hot gases and a salt solution in which the salt concentration is desirably close to its saturation point. Such reactions typically require special reactors, close control of solution concentrations and reactor conditions, etc. Many types of reactors, for example, are unsuitable for use in such systems because the gases strip liquid from the salt solution during the reaction which increases the concentration of the salts in the solution thereby frequently causing precipitation of salts within the reactor and consequent plugging of the reactor. For example, reactors containing such contact elements as packings, valved plates, etc., normally cannot be used with such reactions, since the plugging thereof occurs so rapidly that washing becomes impractical. Even such open holdup-type contact trays as sieve trays and bubble cap trays must normally be frequently cleaned in order to carry out such reactions necessitating shutdown of the reactor and the inclusion of flushing mechanisms. The problem of plugging also is increased in many reactions by the typical countercurrent flow of the gas and salt solution since the gases in such a system contact the salt solution at its point of highest concentration, i.e. just prior to removal from the reactor, which increases the likelihood of salt precipitation or crystallization in the reactor.

The present invention in a first embodiment provides an apparatus, and a process, wherein the problem of crystallization or precipitation of salts from the solution within the reactor, c.g. on the contact trays, and consequent plugging of the contact trays, is alleviated. In accordance with this invention, a reactor is provided which comprises at least one, e.g. two or more, contact trays upon which reaction between the gas and salt solution is carried out, and spray means associated with each tray for spraying at least a portion of a liquid, preferably the salt solution fed to the reactor, against the side of the contact tray first contacted by the gases entering the reactor, normally the underside of the tray. Any form of relatively open tray of the liquid holdup type can be used such as sieve trays, bubble cap trays, etc. The spray means should cover substantially the entire bubble area of the tray, that is, the area where contact occurs between the gas and salt solution.

In general, a sufficient amount of salt solution is sprayed against the surface of the trays first contacted by the gases to keep the salts on the trays dissolved in the solution, particularly at this contact surface. It is at this contact surface that most vaporization of liquid occurs since the gases are hotest and are least saturated at this point and since the concentration of the salt solution on the tray is usually highest at this point. The problem of crystallization is, therefore, most pronounced at this surface. The use of the salt solution for this purpose is especially advantageous since it does not appreciably affect the concentration of the salt solution in the reactor. Of course, the higher the temperature of the gases, the higher the rate of solution required to be fed to the spray means although it is normally desired to keep the amount of solution passed to the spray means as low as possible. Generally, on the order of about 0.1 or 0.4, gallons per minute (g.p.m.) per 2,000 cubic feet per minute of gas (c.f.m.) are suitable.

Although the number of trays, size of trays, etc., are matters of design known to one skilled in the art, it is preferable in this system to design the trays for a liquid holdup, e.g. of from about 20 seconds to 3 minutes, preferably about 1½ minutes per tray with the particular time being a function of the amount of salt solution passed over the trays and the concentration of the solution. The salt solution is generally introduced into the reactor in an amount sufficient to react with the gas, e.g. 0.1 to 20 g.p.m., preferably about 2 to 8 g.p.m. for each 2,000 c.f.m. of gas passed through the reactor. Preferably, about 75 to 95 percent of the reactor feed is supplied to the uppermost tray with the remainder of the solution being sprayed against the contact trays. The amount of solids in the solution will vary depending upon the particular reaction, temperature, etc., but is chosen for efficient reaction between the gas and salt solution. The gases pass through the reactor at a superficial velocity sufficient to maintain the liquid on the contact trays therein but insufficient to blow liquid out of the reactor. Generally, the average superficial velocities are above about 1.5 f.p.s., preferably about 2 to 8.5 f.p.s.

Another problem which can occur in such gas-salt solution reaction systems is plugging of the reactor outlet. The gases passing from the reaction zone are usually close to their saturation point, e.g. 80 to 90 percent saturated and are carrying droplets of solution which can be either liquid or solid forms of the reaction product, generally small enough, e.g. 1 to 100 microns in size, to be supported in the velocity of the rising gas flow, normally between about 2 and 7 f.p.s. Such droplets tend to collect and build up in bends and/or restrictions in the piping connected to the reactor, including the reactor outlet to eventually plug the system. In many systems plugging of the reactor outlet can occur as often as every few, e.g. 2 to 4 hours, requiring frequent shutdown of the system for cleaning which greatly damages the economics of the system. A second embodiment of the present invention provides a solution for this problem of plugging in the reactor outlet piping which is integrated with the reactor so that the requirements for the concentration of the salt solution are not disturbed.

In general, in accordance with this second embodiment, an entrainment zone is provided following the reaction zone, e.g. above the contact trays of the reactor, which includes a contact material and spray means which is arranged to spray the contact material from both sides, advantageously with the salt solution which is one of the reactants. The contact material is sprayed with the salt solution in an amount sufficient to wet the contact material and remove the droplets from the gases exiting from the reactor but insufficient for reentrainment of additional solution in the exiting gases. Additionally, a sufficient amount of solution is sprayed on the contact material to avoid plugging thereof. It was surprisingly found that when the contact material referred to was a woven meshlike structure, small amounts of the salt solution, e.g. about 2 to 5, or 6, preferably about 3 to 3½, or 4, g.p.m. per 2,000 c.f.m. of gas could be advantageously employed. However, a material providing a large amount of contact surface such as Raschig rings, etc., can be employed but it requires larger amounts, e.g. 15 g.p.m. per 2,000 c.f.m. of gas, of the salt solution.

The gas flow through the entrainment zone is maintained below the point at which droplets from the contact material would be reentrained. Typically, gas velocities of about 2 to 7 f.p.s. are suitable. Also, the thickness of the entrainment zone, e.g. 1 to 4 inches, is sufficient to remove droplets from the exiting gases, but not so large as to create a large pressure drop, advantageously to hold the maximum pressure drop in the range of about one-fourth to one-half inch of water. In a preferred aspect of this embodiment of the invention, the salt solution fed to the entrainment zone falls as droplets from the contact material to the upper contact tray in the reactor to provide about 75 to 95 percent of the total feed for the reactor, the remainder of the feed to the reactor being normally provided by the sprays against the bottom surface of the contact trays. It should be noted the entrainment zone in this embodiment also functions as a reactor as well as an entrainment, zone since the salt solution can react therein with the gas.

In particular, this invention involves integration of this process and apparatus with a system disclosed in application Ser. No. 616,682 of Jack D. Terrana and Leo A. Miller, filed Feb. 16, 1967 and incorporated herein by reference. This application discloses a process for recovering sulfur dioxide from sulfur-dioxide-containing gases, e.g. waste gases which involves contacting the gas to be treated with an aqueous solution of a metal sulfite to absorb the $SO_2$ and produce an aqueous solution of the corresponding metal bisulfite which is a precursor of sulfur dioxide. The precursor is separated from the resulting solution, e.g. by crystallization out of the solution, and heated, preferably in the presence of water, to release sulfur dioxide and regenerate the metal sulfite. The process is regenerative since the metal sulfite is advantageously returned to the initial absorption step. Potassium, cesium, and rubidium sulfites are suitable for use in the Terrana and Miller process although hereinbelow the process will be described with reference to potassium sulfite for simplicity.

In the Terrana and Miller process, an aqueous potassium sulfite solution is passed through the reaction zone of the reactor of this invention in an amount sufficient to react with the sulfur dioxide in the gas, e.g. waste gas to absorb the sulfur dioxide into the solution and produce an aqueous potassium bisulfite solution. Generally, these are stoichiometric amounts and the solution of potassium sulfite introduced into the reaction zone is preferably a saturated solution of potassium sulfite. The potassium sulfite solution is preferably a recycle stream and generally contains from about 30 or 40 to 75 weight percent, preferably about 40 or 50 to 65 weight percent solids of which generally at least about 50 percent, desirably above about 75 percent is potassium sulfite, the balance being essentially potassium bisulfite with, possibly, some sulfate. The temperature of the reaction zone is generally maintained at a temperature sufficient for reaction of sulfur dioxide and the potassium sulfite but insufficient for decomposition of the potassium bisulfite product, e.g. below about 230° F. In general, the cooler the aqueous potassium sulfite solution, the more readily sulfur dioxide will be absorbed and, preferably the temperature of the solution is desirably maintained below about 190° F., e.g. at about 120° to 180° or 185° F., since above these temperatures the absorption of sulfur dioxide slows to a point where it is impractical to operate.

As the waste gases react with the aqueous potassium sulfite absorbing solution in the reaction zone, substantial amounts of water vapor are removed from the solution and potassium bisulfite is produced. Vaporization of water occurs since normally the waste gases are not saturated, particularly at the temperatures at which they enter the reactor. As discussed above, vaporization of water from the solution in the reactor can create a problem of crystallization within the reaction zone; however, it is desirable to maintain the solution within the reaction zone near the saturation point, since subsequently in the sulfur dioxide recovery process potassium bisulfite is, as mentioned above, crystallized out of the solution. The crystallization is desirably accomplished by supersaturating the solution through vaporization of water in order to separate it from $SO_2$ partial pressure lowering materials which can also be found in the potassium bisulfite solution which decrease the possible conversion of potassium bisulfite to potassium sulfite during regeneration of the sulfur dioxide absorbed from the waste gases. Consequently, it is desired to vaporize as much water vapor in the reaction zone as possible without causing crystallization, since otherwise the water vapor must be removed during the crystallization of the potassium bisulfite and, although water can be removed during the crystallization of potassium bisulfite, it requires an additional input of energy to the system, whereas if the water is removed in the reactor, the energy used is only such as is normally present.

The avoidance of crystallization in the reactor is advantageously accomplished in accordance with this invention by spraying a portion of the aqueous potassium sulfite solution fed the reactor against the contact surface, e.g. underside of the contact trays within the reaction zone to maintain the solids at the contact surface in solution. Although use of a water spray to maintain the solids on the contact tray in solution would be effective, including the solids on the lower surfaces thereof which are first contacted by the waste gases, the addition of water to the solution would substantially increase the overall energy requirements of the system since it would require the vaporization of the added water subsequently in the process. Whereas the overall feed to the reaction zone is sufficient to remove essentially all of the sulfur dioxide from the gas, generally, 0.1 or 0.4 to 20 g.p.m. of solution per 2,000 c.f.m. of gas, as mentioned above, it is normally desired to keep the amount of solution passed to the spray means for the contact trays as low as possible and generally about 0.1 or 0.4 g.p.m. of solution per 2,000 c.f.m. of gas is suitable.

Utilization of the aqueous potassium sulfite solution as the liquid wetting the contact material in the entrainment zone is also advantageous for similar reasons. Since the waste gases passing through the entrainment zone will emerge essentially 100 percent saturated of expected saturation, e.g. about 85 percent actual saturation, using the potassium sulfite solution in the entrainment zone saturation, as much water as possible from the solution. In addition to reducing the energy requirements of the system utilization of the aqueous potassium sulfite solution in the entrainment zone also serves to remove additional sulfur dioxide from the waste gases by providing an additional contact area between the waste gases and the aqueous potassium sulfite solution. Generally, although above about 90 to 95 percent of the sulfur dioxide can be removed in the reaction zone, an additional 1 to 2 percent can be removed in the entrainment zone. Preferably, the aqueous potassium sulfite solution fed to the entrainment zone which falls from the entrainment zone also constitutes the feed to the reaction zone and falls upon the uppermost contact tray.

The superficial velocity of the gas through the entrainment zone is generally maintained below the point at which the droplets falling from the entrainment zone would be reentrained. Typically, gas velocities of about 2 to 6 f.p.s. are suitable. Potassium sulfite solution is added to the entrainment zone in an amount sufficient to avoid plugging of the contact material and insufficient for entrainment in the exiting of the gases. The entrainment zone of the present invention is highly efficient, as noted above and the solution introduced is preferably divided about equally between the sprays above and beneath the contact material.

Sulfur-dioxide-containing waste gases suitable for use with this process encompass numerous industrial gases such as smelter gases, off gases from many chemical plants, stack or furnace gases from coal- or oil-burning furnaces such as used in electric powerplants, off gases from sulfur furnaces such as used in sulfuric acid plants, etc. Such gases are generally at a temperature of up to about 800° F., often about 150° to 600° F. However, at temperatures above about 400° F. it may be desirable to cool the gas to a temperature of about 225° to 300° F., e.g. by quenching to avoid upsetting the reactor requirements. Likewise, if the gases are below 150° F. it may be desirable to heat them. Often these gases additionally contain minor amounts of suspended particulate solids, e.g. fly ash, and other types of contaminants, e.g. sulfur trioxide. Stack gases emitted from coal-burning furnaces, for example, have entrained therein a particulate solid known as fly ash which may also contain adsorbed sulfur trioxide. Other $SO_2$-containing waste gases may have little or no particulate solids present therein but may contain significant quantities of $SO_3$. Thus, for example, the off gases from sulfur burners employed in the production of sulfuric acid, while substantially devoid of suspended solids, do contain varying levels of $SO_3$, usually present in the form of mist or fine droplets. Conversely, it is also conceivable that certain $SO_2$-containing waste gases may be provided which are substantially devoid of $SO_3$ but which contain suspended solid contaminants. Usually, however, where $SO_2$ is a combustion product in the waste gases, minor amounts of $SO_3$ will also be present; for example, the burning of sulfur-containing fuels at flame temperatures above about 2,500° F., will often result in the production of about two parts of $SO_3$ per 98 parts, by weight, of $SO_2$.

The presence of one or both of these additional contaminants in $SO_2$-containing waste gases has created problems in the Terrana and Miller $SO_2$ recovery method described above, particularly in the reaction zone, which lessen the economic attractiveness of the method. Thus, $SO_3$ present in the waste gases tends to react with the potassium sulfite present in the absorbing solution to yield potassium sulfate, which latter material generally crystallizes out with the potassium pyrosulfite when separated using subsequent crystallization as the separation step. Since it can be a sulfur dioxide partial pressure lowering material and consumes potassium sulfite, potassium sulfate must, with added expense, be removed from the potassium pyrosulfite crystals before the latter are heated to release $SO_2$ if the full efficiency of the process is to be realized. While the different solubilities in water of the sulfate and the pyrosulfite can be exploited for this purpose, the requirement of such an additional separation step detracts from the economics of the process.

As regards the presence of suspended particulate solids in the $SO_2$-containing waste gases treated according to the above method, several disadvantages result therefrom. Fly ash, for example, is an extremely abrasive material and, if unremoved, can present severe erosion problems for the fittings, vessels, etc., of the entire system and tends to separate in the system as a solid mass resulting in a severe plugging problem. Also, most of the $SO_3$ contained in such waste gases is generally present by adsorption on the surface of the fly ash particles and, therefore, is more likely to remain unremoved from the gases if the ash itself is unremoved. Further problems are presented if particulate solids are present in that the solids will become entrained in the absorbing solution and, if not subsequently removed, will tend to build up in concentration as the absorbing solution is regenerated and recycled, thereby slowly and continually reducing the $SO_2$-absorbing properties of the solution and it may interfere with the crystallization of potassium bisulfite.

Often, the suspended particulate solids found in the $SO_2$-containing waste gases are the noncombustible components of fossil fuels and these are frequently referred to as fly ash, mentioned above and described below.

It has now been surprisingly found that in accordance with another embodiment of this invention by so modifying the above $SO_2$ recovery process that the flowing stream of the waste gases is scrubbed with water, e.g. in the reactor, prior to being routed to the chemical absorption zone, then suspended particulate solids, if such are present, are simply and efficiently removed from the gases to provide an acceptably low level of solids content therein before their being sent on to the absorption step. As a further benefit of the prescrubbing step, it has been observed that minor amounts of sulfur trioxide, if present in the gases, it absorbed by the scrubbing water and likewise removed from the gases prior to their being contacted with the potassium sulfite absorbing solution. Also, in accordance with still another embodiment of this invention plugging of gas inlet to the reactor is avoided by arranging a bonnet over the gas inlet and below the scrubbing zone to prevent liquids from passing directly in front of the gas inlet. Normally, as the waste gases enter the reactor, liquid on the walls of the reactor passing directly in front of the inlet picks up the solids in the gases which tend to accumulate at the lip of the inlet, eventually plugging the inlet.

The result observed by interjection of the prescrubbing step between the source of the waste gases and the chemical absorption zone in the $SO_2$ recovery system is that waste gases containing suspended solids in significant amounts are so effectively cleansed of the solids that the problem of solids contamination and buildup in the $SO_2$ recovery process is essentially obviated. In addition, as mentioned above, the liquid, e.g. water, prescrubbing operation is observed to effect a significant lowering in the concentration of sulfur trioxide in the waste gases; moreover, this absorption of $SO_3$ by the prescrubbing water proceeds selectively, that is, without significant absorption of the sulfur dioxide present. As discussed earlier in regard to this particular $SO_2$ recovery process, one of the advantageous effects of the removal of sulfur trioxide from the waste gases entering the prescrubbing zone is a consequent lessening of the amount of potassium sulfate produced in the chemical absorption step and, therefor, a reduction, or perhaps even elimination, of the necessity for costly separations of potassium sulfate crystals from potassium pyrosulfite crystals. Finally, since the scrubbing water acts selectively to absorb sulfur trioxide, substantially all of the dioxide remains in the gases for absorption by the potassium sulfite and, if desired, for subsequent recovery as high purity liquid sulfur dioxide.

Depending on the content of suspended solids in the gases to be treated, the prescrubbing step of the present invention is so effective that just its employment alone may be sufficient to reduce the suspended solids content to a level acceptable for the absorption treatment with the aqueous solution of potassium sulfite. Thus, the prescrubbing operation is generally effective to remove at least about 75 weight percent of the particulate solids present in the waste gases entering that step, and often will remove as high as about 99 or 99.9 percent of such solids.

With waste gases having very high solids contents it may be desirable to precede the prescrubbing operation with a preliminary solids removal operation as, for example, by prescalping means, e.g. by first flowing the gas stream through electric precipitators or cyclone separators, or various combinations thereof to remove a portion of the particles, particularly the larger particles. In any event, given a gas with a certain suspended solids level, then by using the aqueous prescrubbing step of this invention the solids content can be reduced to an acceptable level with the aid of far fewer such precipitators and centrifuges than would otherwise be needed.

The concentration of $SO_3$ present in the waste gases which can be treated according to the method of the present invention will vary according to the source of the gases. Accordingly, even if given $SO_2$-containing waste gases are devoid of suspended solids but do contain $SO_3$, then the present process is effective for removing the $SO_3$ prior to the contacting of the waste gases with the potassium sulfite absorbing solution. In this case the advantage to be gained by the prescrubbing operation is, as mentioned above, a lowering of the byproduction of undesirable potassium sulfate in the chemical absorbing solution. The present process is useful, then, for treatment of $SO_2$-containing waste gases which additionally contain either one, or both of, suspended particulate solids and sulfur trioxide. If the particulate solids content of the gas is extremely low, e.g. contains less than about 0.5 grain per cubic foot, it may be desirable to add particulate solid, e.g. fly ash, to the gas stream to activate and adsorb $SO_3$, thus providing for efficient removal of the particulate solids containing adsorbed $SO_3$ by the prescrubbing operation.

The temperature of the prescrubbing water prior to its being contacted with the stream of waste gases containing $SO_2$ is generally about 50° to 120° F., preferably about 70° to 90° F. The prescrubbing water is preferably pure water, i.e., unaugmented by chemical adjuvants. Thus, for example, whereas prior art techniques of scrubbing $SO_2$-containing gases with water have often involved the use of catalytic additives in the scrubbing water, e.g., manganese and iron salts, for catalyzing the conversion of sulfur dioxide to the more soluble trioxide, the objectives of $SO_2$ recovery processes do not include, and in fact are adverse to, removable of $SO_2$ from the waste gases in the prescrubbing step and, therefore, pure, or clear, water is advantageously employed as the prescrubbing liquid.

The amount of prescrubbing water contacted with the waste gas stream should be sufficient to reduce the suspended solids content and/or the $SO_3$ content to acceptable levels for the subsequent chemical absorption step, but, preferably, not so much as to cause an undue lowering in the temperature of the waste gases across the prescrubbing zone.

Temperature control and retention of as much heat as possible in the waste gases as they pass through the prescrubbing step and are routed on to the chemical absorption step are particularly important in the integrated process because of the necessity at a subsequent step in the recovery process of removing excess water from the system. Since water is continually being added to the $SO_2$-recovery system—for example, as vaporized scrubbing water passing through the impingement target, or as water used to dissolve the pyrosulfite crystals—it is necessary that there be a like quantity of water continually withdrawn from the system. This may be accomplished, for instance, as discussed above, by evaporating a portion of water in the spent potassium sulfite absorbing solution prior to crystallizing potassium pyrosulfite out of that solution. If, on the contrary, excess water is not removed, then the more dilute the spent-absorbing solution and, as discussed above, the greater will be the energy requirement to effect crystallization of a given amount of potassium pyrosulfite out of the spent, i.e., potassium bisulfite-containing, absorbing solution. Additionally, if excess water is not removed during the crystallization step, then the potassium sulfite-containing mother liquor must preferably be reconcentrated before being recycled to the chemical absorption step. This energy requirement for evaporation of the excess water can represent a substantial expense in the overall process.

If, however, the gases entering the $SO_2$-absorbing zone are relatively high in temperature and low in humidity they will cause some of the water in the potassium sulfite absorbing solution to be evaporated and carried out of the system with the cleansed waste gases. Since the amount of water vapor that the waste gases can absorb is proportional to the temperature and relative humidity of the gases, it is desirable, then, that the aqueous prescrubbing method employed be effective to lower the suspended solids and $SO_3$ concentrations while effecting as little a drop in the temperature and increase in relative humidity of the waste gases as possible, for the greater the temperature of the gases entering the chemical absorption zone, the more water vapor that will be removed from the system and dispersed, for example, in the atmosphere.

With regard to the increased efficiency of the above scrubbing method, the following observations have been made, for example, in the operation of a $SO_2$ recovery system operated according to the method of the present invention wherein flue gas containing sulfur dioxide, sulfur trioxide and fly ash was being treated and, in the prescrubbing zone, was directed upwardly through a layer of ceramic packing material. With the discharge nozzles for the scrubbing water positioned above the horizontally disposed target and directed downwardly so that the stream of gases passed countercurrently up through the target and the descending spray of water, the water being discharged at a rate of 0.1 gallon per 2,000 cubic feet per minute of gas (c.f.m.), the flue gas was cooled from about 300° to about 165° F. by the time it had traversed the prescrubbing zone. On the other hand, by positioning the spray nozzles below the target and directing their discharge upwardly, also at the rate of about 0.1 gallon per 2,000 c.f.m., the flue gas was only cooled to about 270° F. by the time it exited the upper surface of the impingement target.

The improved mass transfer or scrubbing technique of the present invention and the apparatus for its employment can be used with advantage in processes other than the $SO_2$ recovery system described above. Thus, the method and apparatus can be employed whenever it is desired to remove suspended particulate solids from a gas stream, particularly where it is desired to remove these solids and still retain as high a temperature for, without substantial increase in the relative humidity of, the carrier gas as possible. Thus, the method and apparatus have numerous applications besides the treatment of $SO_2$-containing waste gases, which applications will be readily apparent to one skilled in the art. In such other applications it may be desirable to employ scrubbing liquids other than water and their use too is contemplated with the present technique.

In still another embodiment of the present invention, as mentioned above, a bonnet is arranged over the gas inlet opening to the reactor to prevent liquid from passing directly in front of the opening which in turn prevents the removal of solid particles from the gas stream by the liquid and their accumulation at the inlet opening. The liquid can be the water from the prescrubber or in the absence of the prescrubber, solution from the absorption zone of the reactor. The bonnet can be a half pipe or a similar construction arranged above the gas inlet opening to direct the gases outwardly into the internal area of the vessel so that they are dissipated over the area of the vessel. The bonnet has a diameter greater than the diameter of the inlet opening and is arranged above the inlet opening to extend into the vessel a distance sufficient to prevent plugging of the gas inlet opening. Generally, the bonnet will extend into the vessel at least about 1 inch, and up to the full diameter of the vessel. The optimum size of the bonnet depends upon the size of the inlet opening and the specific type of bonnet desired but typically the bonnet will extend into the vessel from about 6 to 12 inches up to about one half the diameter of the vessel. Preferably, the bonnet extends into the vessel at an upward angle, e.g. about 5° to 60°, preferably about 10° to 45°, so that the liquids, or solids striking the upper surface of the bonnet will flow to the wall of the vessel outwardly of the inlet opening. Also, the edges of the bonnet can have a trough of sufficient size to collect liquids falling on top of the bonnet and direct them to the reactor wall away from the inlet opening. When a trough is used, the trough is of a sufficient size to carry off the liquids and solids and include depths of up to about 2 or 3 inches, preferably about 1 inch. Furthermore, the end of the bonnet extending into the vessel can be tapered or flared to further distribute the gases over the area of the vessel. A particularly suitable construction for the bonnet is as a pipe having a tapered slot in the lower surface thereof.

The present invention may be better illustrated by reference to the attached drawings and the following example, which are not to be considered as limiting the invention.

FIG. 1 is a flow sheet of a system for the recovery of $SO_2$ which system incorporates the present invention in an advantageous manner;

FIG. 2 is an enlarged schematic view of the absorption column 10 in the system depicted in FIG. 1;

FIG. 3 is a sectional view of a unit for removing particulate solid or liquid soluble contaminants from a gas stream; and FIG. 4 is an elevational view of a packing column support tray.

Referring now to FIGS. 1 and 2, a gas stream containing sulfur dioxide, e.g., flue gases from a power plant or waste gas from an industrial plant, e.g. a sulfuric acid plant or gas containing particulate solids from an aluminum plant, is introduced into reactor 10, having an inside diameter of 30 inches, constructed of 304-type stainless steel and having any suitable corrosion resistant material liner 9 which is resistant against weak sulfuric acid, e.g. lead or suitable synthetic resin liners. The gas passes through line 12, having an internal diameter of 12 inches. The reactor is of a length of 21 feet from line B—B. The amounts and rates given throughout this specification for gas and liquid specifications are based upon a reactor having these dimensions for internal diameter, i.e., 30 inches or a cross-sectional area of about 4.9 square feet, and distances between components positioned in the reactor. It will be obvious to those skilled in the art that the amounts and rates of gases and liquids used will vary depending upon the size of reactor used and the distances between components employed in the reactor, however, these can be referred to as equivalents within the scope of the invention.

The concentration of sulfur dioxide in such gases is generally from about 0.001 to less than about 5 mole percent and frequently is less than about 0.5 mole percent (about 1 percent by weight). For example, a modern electric powerplant of 1,350,000 kw. capacity will burn about 15,000 tons of coal per day. Much coal contains about 3.5 weight percent sulfur, or even more. The emission of sulfur dioxide from a plant of this size using such coal would then amount to about 1,000 tons per day, although the concentration of sulfur dioxide in the stack gases can be very low, for instance on the order of 0.2 to 0.3 mole percent, depending upon the sulfur content of the coal. Significant amounts, for instance greater than about 75 weight percent, of sulfur dioxide can be removed from such gases.

The waste gases may also include $SO_3$, however the concentration of $SO_3$ will vary according to the source of the gases and even flame temperatures used in processing, among other factors. It will usually not be higher than about 0.01 mol percent of the gas, normally being within the range of about 0.0001 to 0.01 mol percent, usually the majority, e.g. more than about 70 percent, of the $SO_3$ in the gas is present as $SO_3$ adsorbed on the surface of particulate solids. A particular advantageous feature provided by the prescrubber resides in its capacity to remove minimal amounts, e.g. from about 0.00001 to less than about 0.005 mol percent, of liquid soluble components in the gas stream; this being particularly useful when the gas is treated preliminarily by prescalping as described below and the residual amounts of $SO_3$ in the gas to be treated in the prescrubber are minimal.

The gas stream in line 12 is generally at a temperature of up to about 800° F., often about 150° to 600° F. For example, suitable gas streams for use in this process include flue gases from power plants burning coal or oil which typically have a temperature in the range of 250° or 300° to 360° or 400° F., off gases from sulfuric acid plants which typically have a temperature in the range of 150° to 200° F. and off gases from smelters which can have a temperature of up to about 800° F. However, at temperatures above about 400° F. it may be desirable to cool the gas to a temperature from about 225° to 300° F., e.g. by quenching with ambient air, to avoid deleteriously affecting the reactor, reactor lining or prescrubber operation. If the gases are below about 150° F., it may be desirable to heat the gas in line 12 to assist in removal of water from the solution in reactor 10. The flue gases will generally have a relative humidity up to about 10 percent, usually from about 1 to 7 percent. Fan 28 in FIG. 1 which draws stripped gas from the reactor, can, if desired, be arranged to blow gas through the reactor. The stripped gases removed from reactor 10 via stack 14 and the incoming gases in line 12 can be passed in a countercurrent heat relationship through a heat exchanger (not shown), if desired.

Sulfur dioxide is absorbed from the gas stream in zone 30 of reactor 10 by absorption through reaction with an aqueous solution of potassium sulfite to produce an aqueous solution of potassium bisulfite, an the stripped gases are emitted through stack 14. Although this illustration will use potassium sulfite, the corresponding sulfites of cesium and rubidium can also be used.

The gases, e.g., flue gases in this illustration, introduced through line 12 pass under bonnet 13 which is arranged over the inlet opening of line 12 into reactor 10 and which extends into the reactor 10 a sufficient distance to prevent water or solution from passing in front of the inlet opening of line 12. It advantageously prevents plugging of inlet line 12 by components, e.g. fly ash, recovered from the gas in zone 20. Bonnet 13 extends upwardly at a slight angle to cause liquid to run back to the wall of reactor 10 and around the inlet opening of line 12 which is flush with the wall of reactor 10. The angle of bonnet 13 is generally from about 5° to 60° preferably about 10° to 45° e.g. 30° and bonnet 13 has a diameter at least equal to the diameter of the inlet opening of line 12, e.g. a 12-inch internal diameter. The most upwardly projecting portion of the bonnet in zone 20 is located at a distance sufficiently away from nozzle 25 to avoid destroying the spray pattern but close enough to avoid excessive vaporization of the mist from the spray and droplets falling off of the target and this distance is generally from about 5 to 70 inches, advantageously from about 10 to 30 inches, e.g. 15 inches, in the arrangements described herein. Any liquid running down the wall of reactor 10 or striking the upward surface of bonnet 13 thereby is directed away from the inlet opening and to the wall of reactor 10 without passing directly in front of the inlet opening.

Reactor 10, although advantageously shown as a single vessel, includes three zones which may, if desired, be separate units. These zones are a prescrubber zone 20, a absorption or reaction zone 30, and a moisture entrainment or demister zone 40.

The waste gases entering reactor 10 first pass through prescrubber zone 20 where particulate solid components, e.g. fly ash, and water-soluble components, e.g. $SO_3$, hydrocarbons including methane, ethane, propane, etc., in the gas are selectively removed from the $SO_2$ containing gas, the $SO_2$ in the gas in turn being selectively removed from the gas in zone 30. Since a majority of the $SO_3$ in the gas is usually adsorbed on the surface of the solids in the gas, it is generally removed upon removal of the solid particles. The solids, e.g. dust, in the gases are generally unreacted materials, e.g. fly ash produced by the chemical plant, or noncombustible components of the fuel.

The chemical makeup of fly ash varies, of course, with the particular fuel being burned, but usually it is composed to a large extent of silica, alumina and iron, with other metal oxides such as oxides of manganese and vanadium frequently being present in minor amounts. Other suspended particulate solids which may be present in the waste gases include, for instance, particulate hollow carbon spheres which are particularly found in oil burner off gases, and which, like fly ash, contain significant quantities of adsorbed $SO_3$. The particle size of the suspended solids found in waste gases can be within about 0.5 to 50 microns, but may be much larger, however the predominant number of the particles range up to about 10 microns.

For instance, the fly ash in a flue gas produced from a coal plant using a turbo feed-coal grinding method had the following size distribution in the flue gas:

| Size in Microns | Weight Percent of total fly ash |
| --- | --- |
| 0–10 | 86 |
| 10–20 | 5 |
| 20–40 | 4 |
| 40–60 | 5 | and from a coal plant using a cyclone feed coal-grinding method had the following size distribution in the flue gas:

| Size in Microns | Weight percent of total fly ash |
| --- | --- |
| 0–10 | 45 |
| 11–20 | 23 |
| 21–45 | 20 |
| 45– | 12 |

The solids loading in gases can range from about 0.001 to 60 grains per cubic foot of gas, for instance, and for flue gases will generally range from about 1 to 10 grains per cubic foot. If the solids loading of the gas is very high, e.g. generally containing more than about 1, e.g. from about 1 to 10 grains of solid per cubic foot of power plant flue gas, which usually have about 1.2 to 4 grains of solid per cubic foot, and particularly if it contains large particles, e.g. having its longest dimension greater than about one-sixteenth inch, it may be desirable to prescalp the gas, for instance in an electrical precipitator or cyclone separator, not shown, before introducing the gas in line 12. Generally from about 80 to 85 percent of the particulate solids can be removed by prescalping with a cyclone separator and a greater amount with an electrical precipitator, which however, is more expensive than the separator.

While the interposition of devices such as electric precipitators and centrifuges, e.g., dry cyclones, between the source of the waste gases and the chemical absorption zone will readily serve to preliminarily remove the bulk of the larger of such solid contaminants, in order to provide essentially complete removal of these solids prior to contacting the gases with the absorbing solution it has heretofore been necessary to employ a great number of such devices in series or parallel relationship. This results in high cost of operation or capital investment. A particular advantageous feature provided by the prescrubber resides in its capacity to substantially remove even minimal amounts, e.g. from 0.001 up to about 1 grain per cubic foot of gas, of particulate solids which are not removed by the use of a separator or electrical precipitator and unless removed, would deleteriously affect the system; moreover, the solids are removed efficiently and with minimum capital cost.

Scrubbing water is introduced via line 24 to the lower section of reactor 10 and is upwardly discharged in the form of a fine spray through spray nozzle 25 having an orifice generally sufficient to provide 0.1 gallons per minute (g.p.m.) per 2,000 cubic feet per minute (c.f.m.) of gas and producing spray in an arc generally from about 10° to 125° e.g. 75° having spray droplets ranging in size generally from about 200 to 800 microns, advantageously for removing particulates of a size up to about 60 microns. The temperature of the scrubbing liquid, e.g. water, is generally from about 50° to 120° F., preferably from about 70° to 90° F. A plurality of nozzles can also be employed as shown in FIG. 2. Positioned generally from about 4 to 18 inches, e.g. about 9 inches, above the nozzle 25 is a substantially horizontally disposed, fluid, e.g. gas or liquid-permeable impingement target assembly having little continuous extensive surface. It advantageously consists of columns or tabular members forming a latticelike tray support 15, preferably formed from an expanded metal, e.g. stainless steel. Held by the support 15 is packing material 22 composed of about three layers of randomly arranged, nonporous, packing components, e.g. Raschig rings, Intalox or Berl saddles, preferably of ceramic composition, the individual components having a longest dimension generally from about 0.25 to 3.5 inches, e.g. 1 ½ inches, and forming a packing column generally from about 1.5 to 5.5 inches in height and advantageously from about 3 to 4 inches in height, weighing generally from about 30 to 70 pounds per cubic foot and having generally from about 50 to 90 percent free space.

As indicated in the drawing, the spray nozzle 25 is positioned near enough to the support 15 to provide a continuous spray of water at a superficial velocity sufficient to overcome gravity, contact and wet the target surface, generally from about 2 to 20 f.p.s., e.g. about 5 f.p.s. The water reaches, contacts and wets the column support and the layer of packing material retained thereon; and falls downwardly as large droplets to carry away particulate solid and $SO_3$ components which are removed from the gas stream. The spray of water entraps the larger solid particles causing them to fall out of the gas stream while partially dissolving water-soluble $SO_3$ in the gas stream and, as the waste gas passes through the impingement material, substantially all, e.g. at least about 90 percent, of the remaining smaller solids and $SO_3$ in the gas strike and stick to the wetted areas of the impingement material, forming droplets which enlarge to a point to overcome the force of gravity and adhesion to the surface of the material and fall or are washed off of the impingement material by the spray of water. Generally, in excess of 95 weight percent, for instance in excess of 99 percent, of the particulate solids may be removed from the gas. The removal of $SO_3$ is particularly desirable since in this system it produces potassium sulfate which deleteriously affects the recovery of $SO_2$ by, for instance by consuming potassium sulfite which would otherwise be consumed by $SO_2$.

Waste gases entering the column via line 12 proceed upwardly through the support 15 and packing 22. The gas is advantageously contacted with the liquid by conducting the gas and liquid concurrently to a fluid, e.g. gas or liquid-permeable impingement target; the gas being conducted to the target at a superficial velocity sufficient at the time of contact with the target to permeate and pass through the target in the presence of a liquid being conducted to the target at a superficial velocity sufficient at the time of contact with the target to wet the target and insufficient to permeate the target in substantial amounts. Generally, the velocity of the gas to the target is sufficient to have a predominant amount, for instance at least 60 volume percent and preferably from about 90 to 100 volume percent, permeate and pass through the target. Generally, the superficial velocity of the gas at the time of contact with the target will range from about 2 to 15 f.p.s. and preferably from about 7 to 12 f.p.s., e.g. 10 f.p.s.

The superficial velocity of the liquid at the time of contact with target is generally from about 2 to 15 f.p.s. and preferably from about 5 to 10 f.p.s., e.g. 8 f.p.s. The amount of liquid employed is sufficient to effect transfer of particulate solid or liquid-soluble components in the gas to the liquid on contact with the target and this will depend upon the amount of particulate solid or liquid-soluble components in the gas, generally the amount of liquid will range from about 0.01 to 1 g.p.m. per 2,000 c.f.m. of gas containing from about 0.5 to 30 grains per cubic foot of particulate solid components and sufficient to dissolve the liquid-soluble components in the gas. The pressure drop of the gas through packing 22 will generally range from about 0.25 to 0.5, e.g. 0.4, inches of water at 2,000 c.f.m. of gas. Moreover, substantial interstitial holdups of liquid in the packing is avoided.

The liquid employed in the present invention can be any suitable liquid which is chemically inert to the impingement target and which does not deleteriously affect the mass transfer, particularly when the mass transfer of nonsolid components is involved, the liquid is advantageously one that will also selectively dissolve and remove the nonsolid components. For instance, water can be employed to selectively and simultaneously remove particulate solids and $SO_3$ from a gas stream. Suspended solids present in the gases impinge upon and are restrained by the wet surface presented by both the support 15 and the layer of packing material 22. These solids are washed off the packing and support by the downwardly falling, spent-scrubbing water which has been checked and driven back by the target assembly. The spent-scrubbing water, containing removed solids and absorbed sulfur trioxide, flows by force of gravity down the funnel-shaped sides of collection bottom 17 of column 10 and out the spent scrubbing water discharge line 26. An important feature is the positioning of a surface such as collection bottom 17 in a droplet-receiving relationship with the impingement target to receive droplets falling off of the target and remove them from zone 20 before substantial evaporation of the droplets can occur and thus substantially preclude the return of particulate solid, e.g. fly ash, or liquid-soluble, e.g. $SO_3$, components to the target by the incoming gases. Referring to FIG. 2, the distance between points $a$ —$a$ in this illustration is 6 feet and surface 17 projects downwardly at a 60° angle to outlet 26. Suspended solids and sulfur trioxide are thus removed from the waste gases before the latter come in contact with the chemical absorbing solution. If desired, the spent-scrubbing water, which may often have a pH of about 2 to 4, depending on the amount of sulfur trioxide in the waste gases, may be treated for separation and recovery of the solids, e.g. fly ash, and the sulfuric acid. One highly advantageous feature of this prescrubbing arrangement is that low volumes of water can be used to wet the impingement target, a particularly attractive feature since the amount of water within the present system can affect the overall efficiency of the process. Accordingly, it is desirable to only use an amount of water sufficient to contact, wet, and fall from the impingement target surface and collect the particulate solid materials and $SO_3$. Generally, less than about 0.1 g.p.m. of water, preferably from about 0.01 to 0.07 g.p.m., e.g. 0.05 g.p.m., per 2,000 c.f.m. of gases, are used. The advantage of using less than about 0.1 g.p.m. is illustrated in table I below. By using this prescrubber arrangement, it is possible to control any increase in humidity of the gases passed through prescrubber 20 generally to not over about 8 to 10 percent, preferably 2 percent, and the temperature drop across the prescrubber is generally less than about 60° F., preferably less than about 50° F.

Use of the scrubbing apparatus described here and in the drawings, particularly in FIG. 2, has been found to provide, in addition to an extremely low temperature drop and minimal increase in the relative humidity of the gas across the scrubbing zone, particularly when processing gases at temperatures up to 500° F., also provides an assembly which is surprisingly free of plugging difficulties in contrast to a prescrubbing assembly employing continuous overhead water spray delivery which resulted in a significant temperature drop, e.g. about 100° F., and a significant increase in relative humidity, e.g. about 10 percent, and also became clogged within a short time, e.g. 2 hours, with solids removed from the gas stream. The positioning of the spray nozzles on the underside of the target permits extended operation times, e.g. up to about 16 hours, without such plugging problems. If desired, however, there may also be provided in the scrubbing apparatus of the present invention a second spray assembly 27 positioned above the target which may be activated periodically by actuating device 29, a pressure drop control, for instance about every 8 to 16 hours for a 1- to 3-minute period, to direct a downward spray on the target and thus irrigate the packing material and provide for continuous operation.

The absorber or reaction zone 30, as shown, is advantageously designed for intimate contact of countercurrently flowing gas and liquid streams, although it may be designed for concurrent flow if desired. As shown, the absorber section is illustrated with two substantially horizontally disposed sieve trays, e.g. which can be of a conventional type. Bubble cap trays can also be used. The gases are passed through reactor 10 at a superficial velocity sufficient to maintain liquid on the contact trays therein but not so great as to blow liquid out of the reactor. Typical average superficial velocities of the gases through absorber section 30 of reactor 10 are generally at least about 1.5 feet per second (f.p.s.) and advantageously from about 2.0 to 8.5 f.p.s. The potassium sulfite solution is introduced into reactor 10 through line 16, generally at a rate of from about 0.1 or 0.4 to 20 g.p.m., preferably from about 2 to 8 g.p.m., for each 2,000 c.f.m. of gas, and the potassium bisulfite solution is removed through line 18. Potassium sulfite, generally from about 40 to 60 weight percent, e.g. 50 percent, of the total solution to be introduced, is conducted from line 16 through line 16''' and line 44' of demister 40, described below, to fall onto the surface of tray 32 and flow from tray 32 onto tray 34. Additional solution can be added, if desired, through line 16'. The potassium sulfite reacts with the sulfur dioxide in the gases passing through the sieve trays to produce an aqueous solution of potassium bisulfite which passes from tray 34 into the catch basin formed by downwardly projecting baffle 36 from which it is removed through line 18. The sulfur dioxide content of the gas is substantially reduced, for instance, to less than about 0.02 mole percent in a stack gas containing more than about 0.2 mole percent. The potassium bisulfite is separated, e.g. crystallized, and can be recovered in crystalline form as potassium pyrosulfite which is subsequently decomposed to produce potassium sulfite and sulfur dioxide. Potassium bisulfite is transformed to potassium pyrosulfite during crystallization. The sulfur dioxide is drawn off and can be either cooled and compressed to provide a liquid product or sent as a gas to a sulfuric acid plant or sent to a reduction furnace for conversion to elemental sulfur. The potassium sulfite can be recycled to the reaction zone wherein additional sulfur dioxide is absorbed. The reactions utilized include:

I     $K_2SO_3 + SO_2 + H_2O \longrightarrow 2KHSO_3$

II     $2KHSO_3 \xrightarrow{cool} K_2S_2O_5(c) + H_2O$

III     $K_2S_2O_5 \xrightarrow{heat} K_2SO_3 + SO_2(g) + H_2O$

For reaction I to proceed, the temperature of the solution in absorption or reaction zone 30 should be maintained above the temperature at which sulfur dioxide is absorbed by reaction with the aqueous solution of potassium sulfite, and below the temperature at which potassium bisulfite decomposes or reaction III proceeds, e.g. below about 230° F. In general, the cooler the solution of potassium sulfite, the more readily sulfur dioxide will be absorbed by the solution and react with potassium sulfite. With stack or furnace gases, however, the temperature of the solution will generally be about 90° F. or 100° F., although ambient temperatures are suitable. Preferably, the temperature is maintained below about 190° F., e.g. at about 120° to 180° or 185° F., since above these temperatures ranges reaction I begins to slow to a point where sulfur dioxide will not be readily absorbed into solution because the partial pressure of the sulfur dioxide becomes too high. Since the stripped flue gas is ultimately, after processing in demister zone 40, discharged into a stack, it is desirable to maintain the temperature of the stripped gases at a temperature sufficiently high to maintain their buoyancy so that they will rise in the stack, e.g. above about 185° F. At lower temperatures, e.g. 135° F., a fan can be used to draw off the gas. Generally the temperature of the gas from the absorber zone 30 into demister zone 40 ranges from about 120° to 180° F., e.g. 135° F. The temperature of the stripped gas in line 14 out of the demister generally ranges from about 110° to 170° F., e.g. 130° F., but it can be increased, if desired, by the introduction of a hot furnace gas through line 14'. Generally the gas out of the demister is from about 85 to 100 percent saturated with water.

Potassium sulfite solution is also advantageously sprayed against the underside of trays 32 and 34 by spray elements 38. Elements 38 are located generally from about 4 to 18 inches, e.g. 9 inches, from their respective trays. The velocity of the liquid is sufficient to overcome gravity. As the potassium bisulfite solution is formed on the trays, water is stripped from the solution by the hot flue gases which tends to supersaturate the solution and crystallize potassium pyrosulfite and plug the trays. Potassium sulfite solution from line 16 is passed to the spray elements through line 16''. The sprays are directed against the bottom of the trays where the hot flue gases first contact the trays, since at this point most evaporation of water occurs and, therefore, crystallization. A sufficient amount of solution is sprayed upwardly against the under or contact surface of the trays to keep the solids dissolved in the solution on the trays, particularly at the surface where the flue gases impinge and thus advantageously provide for continuous operation of the process. It is desired to keep the amount of solution passed to the spray elements as low as possible and generally the amount of solution is less than about 0.1 or 0.4 g.p.m. per 2,000 c.f.m. The higher the temperature of the waste gases, the higher the rate of solution required to be fed to spray elements 38. For example, with gases entering reactor 10 at 300° F., about 0.1 to 0.2 g.p.m. per 2,000 c.f.m. of gas is suitable.

The potassium sulfite solution is passed through the absorber section 30 in an amount sufficient to react with the sulfur dioxide in the flue gas, i.e., absorb the sulfur dioxide in the solution, and produce potassium bisulfite. Generally these are stoichiometric amounts and advantageously a solution containing about 25 weight percent $K_2SO_3$ and 25 weight percent $KHSO_3$ can be employed.

The solution of potassium sulfite introduced into the reaction zone is preferably a recycle stream and, generally, contains from about 30 or 40 to 75, preferably about 40 or 50 to 65 weight percent solids of which generally at least about 50 percent, desirably above about 75 percent, is potassium sulfite and the balance is essentially potassium bisulfite with, possibly, some sulfate. This recycle stream is preferably a saturated solution of potassium sulfite. The potassium sulfite solution can contain a sufficient amount of an oxidation inhibitor, for instance hydroquinone, e.g., about 0.001 to 0.1 percent, to inhibit the oxidation of the sulfite ion. The temperature of this stream is controlled to avoid upsetting the requirements of reactor 10. The temperature of the recycle stream is typically from about 90° to 160° F. In general, a sufficient amount of potassium sulfite solution if contacted with the waste gas in reactor 10 to remove as much of the sulfur dioxide as possible, desirably above about 90 to 95 percent, and the residence time of the solution in the reactor, etc., is adjusted accordingly. The solution flow rate in absorber zone 30 is normally maintained sufficiently fast, and the residence time of the solution in absorber zone short enough, that crystallization problems do not occur within the absorber zone. With a slow flow rate and a high residence time, absorption of sulfur dioxide will occur; however, the solution becomes very concentrated and, therefore, the danger of crystals depositing from the solution and plugging the sieve trays is increased. The flow rate of the solution will depend upon the temperature of the gas, the amount of $SO_2$ in the gas, the temperature and concentration of the potassium sulfite solution, it will, however, generally range from about 0.1 to 20 g.p.m., preferably from about 2 to 8 g.p.m. per 2,000 c.f.m. of gas. Baffle 36 forms a collector trough or catch basin for the potassium bisulfite solution. Baffle 36 can be sloped, e.g. from about 10° to 45° or horizontal, so that any crystals contained in the potassium bisulfite solution will flow downwardly toward line 18. A relatively thick layer, e.g. a few inches (e.g. 8 inches) or several feet, of solution is maintained on baffle 36 to avoid formation of crystals in the solution and, preferably, the holdup time in the catch basin is short, for instance generally from about 5 to 10 minutes.

The product of the reaction zone is preferably a saturated solution of potassium bisulfite, and, accordingly, the concentration of the solution is desirably maintained at just below saturation by the addition of sufficient water to avoid precipitation of potassium bisulfite. As noted above, this would occur as the crystallization of potassium pyrosulfite.

The solution resulting from a reaction of an aqueous solution of potassium sulfite and a stack gas inherently contains many ingredients, for instance the following is an example:

|  | Weight percent range | |
|---|---|---|
|  | Generally | Usually |
| Potassium sulfate | 0 to 8 | 1 to 6 |
| Potassium bisulfite | 5 to 40 | 10 to 30 |
| Potassium sulfite | 10 to 50 | 20 to 45 |
| Water | balance | balance |

The sulfur dioxide is present in chemically combined form, for instance as potassium bisulfite, which can be considered a sulfur dioxide precursor, in the solution and is present or in contact with $SO_2$ partial pressure lowering materials for instance, metal salts, e.g. alkali metal salts, generally the potassium salts such as unreacted potassium sulfite and potassium sulfate, produced by reaction between sulfur trioxide and potassium sulfite. The purity of the potassium bisulfite in contact with the $SO_2$ partial pressure lowering materials is generally less than about 60 weight percent on a dry basis.

The amount of solids in the solution will vary depending upon the temperature, but it is generally maintained sufficiently high for efficient sulfur dioxide recovery. There will generally be between about 40 or 45 and 75 weight percent, preferably between about 45 or 50 and 55 or 65 weight percent, solids in the solution. The amount of potassium bisulfite and potassium sulfite in the solids will vary depending upon the total percentage of solids and the temperature of the solution. In general, about 5 to 50 or 60 weight percent, preferably 10 to 35 or 50 weight percent, is potassium bisulfite and generally 40 or 50 to 95 weight percent, usually about 50 or 65 to 90 weight percent, is potassium sulfite. For example, at 77° F., a saturated aqueous solution of potassium pyrosulfite and potassium sulfite will contain about 5 percent potassium pyrosulfite and 47 percent potassium sulfite; at about 104° F., this solution will contain about 7 percent pyrosulfite and 48 percent sulfite; and at about 149° F. the solution contains about 12 percent pyrosulfite and 48 percent sulfite.

The stripped flue gases in reactor 10 pass from absorption reaction zone 30 to the moisture entrainment or demister zone 40 which includes a woven mesh contact area. The pressure drop of the gas through zone 30 will generally range from about 1.5 to 4.5, e.g. 2.5, inches of water at 2,000 c.f.m. of gas. The woven mesh 42 is a material chemically inert to the components of the system, e.g. 304 stainless steel, and similar in structure and appearance to steel wool; it is shown in FIG. 2 as being retained on a column support 43. Potassium sulfite solution from line 16 passes through line 16''', and lines 44' and 46' to nozzles 44 and 46, respectively, generally positioned from about 4 to 18 inches, e.g. 9 inches, from 42, which continuously spray the solution onto the woven mesh 42 from opposite sides of the assembly, i.e., top and bottom, to advantageously avoid plugging problems and maintain a continuous operation. The demister zone 40 serves to remove droplets of solution from the gases exiting from reactor 10 to thereby limit chemical losses. The droplet can be liquid or solid forms of the reaction product generally small enough, for instance from about 1 to 100 microns in size, such that it can be supported in the velocity of the rising gas flow, normally between about 2 to 7 f.p.s. It was surprisingly found that when the contact material referred to was of a woven meshlike structure, small amounts of solution could be advantageously employed. However, a material providing a large amount of contact surface and a highly irrigatable contact surface, e.g. Raschig rings, can be employed but require larger amounts, e.g. 15 g.p.m. of solution. The thickness of demister zone 40, e.g. about 1 to 4 inches, is sufficient to remove droplets from the exit gases but not so large as to create a large pressure drop, and the gas flow through demister zone 40 is below the point at which droplets from the contact area would be reentrained. The maximum desirable pressure drop is generally in the range of about one-fourth to one-half inch of water and, typically, gas velocities of about 2 to 6 f.p.s. are suitable. Generally, solution is added to the demister zone in an amount sufficient to avoid plugging of the demister and insufficient for entrainment in the exiting gases. This demister embodiment is highly efficient and only requires the use of small amounts of solution. For example, generally about 2 to 5 or 6, preferably about 3 to 3 ½ or 4 g.p.m. of solution per 2,000 c.f.m. of gas flow are suitable, being divided preferably equally between nozzles 44 and 46. The amount of solution used will decrease with decreasing concentration of the solution and it is desirable to maintain the flow as low as possible. The demister zone 40 also functions to remove the last traces of sulfur dioxide contained in the exiting gases. For example, the demister normally removes an additional 1 to 2 percent of the total sulfur dioxide in the incoming waste gases.

In this system sufficient amounts of the $SO_2$ partial pressure lowering materials are separated from the potassium bisulfite to increase the partial pressure of the sulfur dioxide in the potassium bisulfite. The separation of the $SO_2$ partial pressure lowering materials can be effected by any suitable procedure, by for instance by selectively extracting the potassium bisulfite from the solution or by extracting any one of the $SO_2$ partial pressure lowering materials from the solution. The separation is preferably conducted by crystallizing the potassium bisulfite (which transforms to potassium pyrosulfite during crystallization) out of the solution for further treatment in accordance with the system as set forth below.

The release of sulfur dioxide from a precursor such as potassium pyrosulfite depends upon its partial pressure under given conditions, e.g. when in association with or without other materials including salts such as potassium sulfate and potassium sulfite which are generally present in the resulting solution produced by reaction of the sulfur-dioxide-containing stack gas with the aqueous solution of potassium sulfite. The partial pressure of sulfur dioxide in its precursor in the presence of other materials, e.g. potassium salts, in the reaction product solution at its boiling point at standard pressure conditions is so low, for instance for the typical solution described in an example below it is about 1.5 mm. of Hg, that it can not be released in an economically feasible manner. In sharp contrast to this, its partial pressure when the potassium pyrosulfite is in relatively pure form, for instance a purity greater than about 98 weight percent on a dry basis, is relatively high, for instance about 300 mm. of Hg. The purity of the potassium pyrosulfite is increased in accordance with the present invention to generally greater than about 65 weight percent, preferably greater than about 90 or 95 weight percent. The following table sets forth the partial pressure of the sulfur dioxide in potassium pyrosulfite for the indicated purity.

TABLE

| Purity of $K_2S_2O_5$, Wt. percent (dry basis) | Partial Pressure of $SO_2$, mm. of Hg. |
| --- | --- |
| 65 | 5.0 |
| 70 | 6.1 |
| 75 | 8.5 |
| 80 | 13.3 |
| 85 | 21.0 |
| 90 | 33.5 |
| 95 | 75.0 |
| 98 | 300.0 |

The potassium bisulfite can be advantageously separated or recovered advantageously in the form of potassium pyrosulfite by crystallization from the $SO_2$ partial pressure lowering materials in the solution. Crystallization of potassium pyrosulfite can be accomplished using suitable crystallization procedures, for instance by supersaturating the solution by heating it in a vacuum or advantageously by cooling the aqueous potassium bisulfite solution to a temperature at which a substantial portion of the pyrosulfite crystallizes, e.g. below about 100° or 110° F., with the lower limit being dictated by economics. For example, when a saturated solution of potassium bisulfite at 149° F. is cooled to 104° F., approximately 40 percent of the pyrosulfite crystallizes whereas when the solution is cooled to 77° F., approximately 70 percent of the pyrosulfite crystallizes. Since potassium sulfite is more soluble than potassium bisulfite, substantially pure, e.g. greater than about 95 weight percent, pyrosulfite crystals can be obtained.

The potassium pyrosulfite crystals can be separated, e.g. by separation techniques such as centrifugation or filtration and heated to the decomposition temperature therefor and under ambient pressure conditions, these temperatures are generally greater than about 100° F. and sufficient to decompose the potassium pyrosulfite, for instance above about 230° F. and up to about 600° F. but preferably below temperatures at which substantial amounts of potassium sulfate form, e.g. 400° F., and preferably above about 300° F. under essentially anhydrous conditions, to release sulfur dioxide and convert the potassium pyrosulfite to potassium sulfite which is suitable for reuse. This decomposition method eliminates the need to vaporize large amounts of water to remove sulfur dioxide when anhydrous conditions are desired. The hot potassium sulfite produced upon decomposition of the crystals is combined with the filtrate resulting from the separation of the potassium pyrosulfite and recycled to the reaction zone.

Referring to FIGS. 1 and 2 again, the potassium bisulfite solution is removed from reactor 10 through line 18 to surge tank 48 from which it is pumped (e.g. generally having only a residence time of only about 5 to 20 minutes in the surge tank) expeditiously to avoid substantial cooling and crystallization and plugging within the tank. It is pumped through line 52 by pump 54 to the flash cooler-crystallizer zone 50. Line 18 has a vacuum breaker line 18' associated with it. The solution pumped through line 52 may, if desired, be passed through a filter 56 to remove solids from the solution.

The flash cooler-crystallization zone 50 includes a flash chamber 58 wherein the solution can be advantageously cooled by vaporization of water from the solution, and a crystallization tank 60. Flash chamber 58 is maintained under vacuum, generally of about 0.5 to 4 p.s.i.a., usually from about 0.8 to 1.5 p.s.i.a., by steam ejectors 62 and 64. Such ejectors can draw a vacuum of about 0.5 p.s.i.a. As shown, steam ejectors 62 and 64 draw a vacuum on the chamber 58 through line 66. The pressure in chamber 58 is controlled by the addition of air through line 68 to control the temperature of the solution. The control of the pressure in turn controls the boiling point and pressure drop, and therefore the temperature of the solution in the flash chamber and the amount of water vaporized from the solution. Heat exchange 70 in line 66 condenses the water evaporated from the solution in chamber 58. The condensate passes through line 72 for use in dissolving the potassium pyrosulfite crystals. The steam from ejectors 62 and 64 is also condensed and passed through lines 74 and 76 for later use in the system.

The solution in chamber 58 is normally cooled to a temperature sufficient to crystallize, i.e., remove from solution, a sufficient amount of potassium pyrosulfite to compensate for the sulfur dioxide absorbed from the gas stream in line 12 and thereby maintain a proper balance of solids in the solution for recirculation thereof. The potassium bisulfite crystallizes as potassium pyrosulfite. The amount of potassium pyrosulfite crystals removed depends upon the conversion of potassium sulfite to bisulfite in the stripper and generally, from about 3 to 15 pounds of potassium pyrosulfite crystals are removed for each pound of sulfur dioxide absorbed from the waste gases. For instance, if the conversion of sulfite to bisulfite in the aqueous solution is about 50 percent, about 7 pounds of crystals will be removed in order to provide a solution particularly suitable for reuse in the absorber section, whereas at 20 percent conversion this amount will increase to about 15 pounds of crystals per pound of sulfur dioxide, and at a theoretical 100 percent conversion, the amount will be about 3 to 3 ½ pounds per pound of sulfur dioxide. The temperature drop in chamber 58 is determined by control of the inlet temperature of the solution, the pressure within chamber 58, residence time of the solution in chamber 58 (e.g. generally from about 15 minutes to 2 hours), recycle ratio, etc. Since temperatures of the inlet solution generally are in the range of about 80° to 200° F., usually from about 130° F. to 160° F. for power plant type gas processing and usually from about 80° to 110° F. for sulfuric acid plant type gas processing, and the solution will boil at about 104° F. at 1 p.s.i.a. and about 85° F. at 0.5 p.s.i.a., temperature drops generally of about 10° to 70° F. or 90° F., preferably about 30° to 50° F. or 70° F., are usually required to crystallize the desired amount of potassium pyrosulfite. The amount of water removed in the flash cooler from the system is advantageously used to maintain the water in the system in balance by correlation of the amount of water removed in the flash cooler with the amount of water removed by the gas stream in the reactor. Although water can be easily removed in the flash cooler, it requires an input of energy whereas if removed in the reactor, the energy used is only such as is normally present. Thus, a particularly attractive feature provided by prescrubber 20 resides in accomplishing the prescrubbing with liquid, e.g. water, while at the same time avoiding a significant drop in the temperature of the gas and a significant increase in the relative humidity of the gas; thus providing the gas in the absorber zone at optimum temperatures and relative humidity for evaporating water from the system inexpensively and efficiently. In the event a gas stream having a low temperature and high relative humidity is employed and has limited capacity for absorbing water, great flexibility is provided for the system in that excess water can be removed by the flash cooler.

The efficiency of the flash cooler in removing water also provides for advantageous control of filtration conditions. The filtration system employed can be a simple rotary filter and advantageous control over the temperature and residence time of the solution can be obtained with facility to control the size of crystals to enhance filterability with increased filtration rates and provide crystals of greater purity, e.g. 99 percent pure. It also desupersatures without nucleation and substantially avoid plugging problems which would characterize the use of a heat exchanger under the conditions of processing in the present system.

The cooler solution, or slurry, is passed from flash chamber 58 to crystallization tank 60 through line 78. The solution residence time within the crystallization tank 60 is sufficient to produce a proper size crystal for filtration, e.g., crystals larger than about 300 mesh and up to about 10 mesh. Generally a volume residence time of from about 5 minutes to 2 hours, or more, preferably of about 10 minutes to 45 minutes are suitable for the production of crystals of the desired size. Crystals can be obtained wherein about 80 percent of the crystals are between 10 and 60 mesh using a 4-minute retention time. Another important factor in producing crystals of this desired size is the control of the pH of the solution, e.g. generally between about 6.6 to 7.4. The pH can be controlled by adjusting the specific gravity of the reaction solution conducted out of the reactor, for instance using density control device 69 in line 71. Recycle line 80 and pump 82 are provided to control the temperature and residence time of the solution. The bottom of flash chamber 58 slopes and the line 78 extends to the bottom of tank 60 to avoid plugging by crystals formed in chamber 58 and tank 60. A demister 84, arranged in the upper section of flash chamber 58, is constructed and operates in a manner similar to demister 40 to remove entrained droplets in the gas passing through line 66.

The slurry of potassium pyrosulfite crystals formed in crystallization tank 60 is pumped by pump 86 through line 88 to a rotary drum vacuum filter, generally designated as 90. The drum filter includes a rotary drum 92 and a pan 94. The slurry is introduced into pan 94 through line 88 and drawn by a vacuum applied internally of drum 92 through the filter surface of the drum by vacuum pump 96. The filtrate solution drawn from filter drum 92 is passed through line 98 to filtrate tank 100 where it is collected and from which it is subsequently pumped through line 102 by pump 104 to absorber feed tank 106.

The potassium pyrosulfite crystals retained on the filter surface on drum 92 are removed by a scraper or doctor blade 108 and passed to a dissolver tank 110. The filtration rate of the filter is maintained as high as possible while still obtaining a clear filtrate or solution leaving the filter through line 98. Filtration rates of about 900 to 4,000, preferably 1,500 to 3,000, pounds of crystals per hour per square foot of surface area of the filter are usually obtained. The higher the filter rate the smaller the surface area of the filter required. The size of the filter cloth used can be important in maintaining a clear filtrate. For instance, if crystals filter through the cloth, the pH of the filtrate solution will drop, e.g. to a pH of about 6.3, and thus adversely affect the recycle stream by deterring the absorption of $SO_2$ as a result of an increase of the bisulfite. The vacuum applied to the drum filter by pump 96 is maintained so that the vacuum applied at drum 92 is less than the vacuum, e.g. higher pressure, applied in chamber 58. To use a lower pressure at this point in the system would additionally cool the solution to crystallize additional potassium pyrosulfite inside drum 92 which would plug the system. The filter screen utilized on drum 92 is preferably a monofilament cloth, e.g., nylon, chemically inert to the solution and slurry, which has openings generally of about 10 to 50, or 60 microns in size, preferably about 20 to 40 microns in size. The crystals can be advantageously washed by spray 112, preferably using a side stream of the 50 percent solution being conducted to the stripper column, on the filter surface to further enchance the purification of them. Since the 50 percent potassium bisulfite solution would be saturated, substantially none of the crystals are dissolved and the purity of the crystals are increased by displacement washing of the mother liquor. Also, if desired, a steam sparge or blowback 114 can be applied to the filter surface near scraper blade 108 to clean the filter surface by removing any crystals not removed by blade 108.

The potassium pyrosulfite crystals can be advantageously heated in the presence of water to enhance their decomposition to produce sulfur dioxide at relatively low temperatures. The water employed can be residual water of the mother liquor contained by the crystals or it can be added water; it can be in any suitable form, e.g. liquid or vapor form; and it is used in amounts sufficient to enhance the decomposition of the potassium pyrosulfite to produce sulfur dioxide. These amounts are at least about 0.01 weight percent, generally from about 1 to 99 weight percent and advantageously from about 20 to 75 weight percent based on the potassium pyrosulfite and water. In amounts up to about 20 weight percent water, damp crystals are provided and in amounts of about 40 weight percent, for instance, a solution can be provided. When in solution, however, the potassium pyrosulfite is in the bisulfite form.

The crystals passed into tank 110 are dissolved in sufficient water for ease of handling. Generally, enough water is added to at least form a slurry which is pumpable, e.g., contains about 60 to 70 percent solids, although, if desired, sufficient water can be added to form a solution. A ratio of solids to water in dissolver tank 110 is advantageously controlled by density means to a density control 103. Generally about 35 to 55 percent, preferably about 40 to 50 percent, solids are in the solution which is removed from dissolver 110 through line 116 by pump 118. Water is supplied to dissolver 110 in the form of condensate from the cooler 70 via line 72 and via lines 74 and 76 from the steam ejectors 62 and 64, respectively. Fresh water can be added through line 120, if desired.

The potassium pyrosulfite in the presence of, or in contact with, water is heated to temperatures sufficient to produce sulfur dioxide and temperatures generally from about 100° to 225° F., preferably from about 150° to 225° F. can be used under ambient pressure conditions.

The decomposition of the potassium pyrosulfite in contact with water can be conducted under ambient pressures or superatmospheric pressures, for instance from about 0 to 300 p.s.i.a., generally from about 15 to 150 p.s.i.a. although ambient pressures can be advantageously employed. In a modification of this aspect of the present invention, superatmospheric pressures can be employed when the potassium pyrosulfite is in aqueous solution to increase the concentration of the solution at higher temperatures, e.g. above about 230° F. and up to about 375° F., with a consequent increase in the partial pressure of sulfur dioxide in the potassium pyrosulfite and an enhancement of the production of sulfur dioxide. Generally the water employed in this aspect is from about 5 to 70 weight percent. For instance, if potassium bisulfite solutions are heated under a pressure of about 100 p.s.i.a. with a temperature of about 350° F., the solubility of the pyrosulfite crystal is much greater, e.g. about 75 weight percent based on the crystals and water. This higher concentration provides a much higher partial pressure of sulfur dioxide than at lower concentrations and the percent conversion of potassium pyrosulfite to potassium sulfite is greater.

The utilization of water to enhance decomposition of the potassium pyrosulfite is preferable to the anhydrous procedure since it obviates the desirability of using such inert materials and the expense of handling such materials and it provides for the production of sulfur dioxide at significantly lower temperatures and a higher conversion of potassium pyrosulfite (bisulfite) to sulfur dioxide.

Since there is generally a small amount of sulfur trioxide present in waste gases containing sulfur dioxide, a small amount of potassium sulfate is formed which is periodically removed. Additionally, oxygen present in the waste gases can react with the potassium sulfite to produce additional potassium sulfate so that it may be desirable to add an oxidation inhibitor, e.g. organics such as hydroquinone, etc., to the potassium sulfite solution. The potassium sulfate generally crystallizes with the pyrosulfite and can be separated by periodically redissolving the pyrosulfite crystals, which are more soluble in water than potassium sulfate. The redissolved pyrosulfite crystals can be recycled to the reaction zone after the solid potassium sulfate is removed. Potassium sulfate is desirable as a constituent of fertilizers. If desired, this process can be directed toward the production of potassium sulfate by omitting the inhibitor and increasing the amount of potassium sulfate produced.

The potassium bisulfite solution in line 116 is passed to stripper zone, designated generally as 125, where the solution is heated to a temperature, e.g. 230° to 300° F., sufficient for decomposition of the potassium bisulfite to produce sulfur dioxide and a potassium sulfite solution. The decomposition is advantageously accomplished in a multiple-effect stripping operation to increase the overall conversion of potassium bisulfite to potassium sulfite and reduce the energy, i.e. steam requirements of the system. As illustrated, stripper zone 125 includes two stripping columns 122 and 122', although, if desired, three or more effects may be used. The solution fed to column 122 through line 116 is heated by steam in reboiler 138 to a temperature sufficient to decompose the potassium bisulfite in the solution to produce an overhead gas stream comprising sulfur dioxide and water vapor. This overhead stream is removed through line 124 and passed to reboiler 138' for the second stripper column 122' to provide the necessary energy therein for decomposition of additional potassium bisulfite. The conversion of potassium bisulfite to potassium sulfite in any particular stripper column is limited, since once the partial pressure of sulfur dioxide in the vapors within the column equals the partial pressure of sulfur dioxide in the solution, no additional sulfur dioxide can be removed from solution regardless of the energy supplied to the column. When using several columns fresh steam is produced in each column by removal of water from the solution which can be saturated with additional sulfur dioxide whereby additional decomposition of potassium bisulfite and improved conversion are obtained. Additionally, the energy or steam requirements of the system are reduced by recovering energy from the vapors produced in each stripper column through the use of these vapors to provide heat for the succeeding column. Following reboiler 138' wherein the water vapor in line 124 will be mostly a condensed product, this product is passed through line 126 to separator 128. The condensed water is removed from the bottom of separator 128 through line 130 and the sulfur dioxide as a product gas through line 131. The partially decomposed potassium bisulfite solution is withdrawn from column 122 through line 134 and passed by pump 136 to column 122' where additional potassium bisulfite is decomposed. Overhead vapors are removed from column 122' through line 124' and heat exchanger, i.e. cooler-condenser 126' to tank 128'. Condensed water vapor is removed from separator tank 128' through line 130' and sulfur dioxide as a product gas through line 131'. The stripper bottoms, which is now a potassium sulfite rich solution, is conveyed through line 134' by pump 136' to the absorber feed tank 106. A portion of the stripper bottoms in line 134 is passed through reboiler 138 to maintain proper temperature, e.g. generally from about 230° to 300° F., within the stripper column 122. The potassium sulfite solution collected in the absorber feed tank 106 is pumped by pump 140 through line 142 to feed inlet line 16 for reactor 10. The water separated in lines 130 and 130' is passed to dissolver 110 for use in dissolving potassium pyrosulfite crystals.

The first effect separator column is generally operated at an elevated pressure and temperature sufficient to decompose the potassium bisulfite, for instance up to about 200 p.s.i.a. and 600° F., but preferably below temperatures at which substantial amounts of potassium sulfate form, e.g. 400° F., and below pressures of about 150 p.s.i.a. Typically, the first effect separator 122 is operated at a temperature of about 275° to 350° F., or 400° F., and a pressure of about 40 to 80 p.s.i.a., preferably about 40 to 60 p.s.i.a. These conditions are chosen to hold the steam requirements down, that is, the amount of steam required to produce the desired amount of sulfur dioxide. In general, it is desired to hold the steam requirements within about 2 to 6, preferably about 2 to 4 pounds of steam per pound of sulfur dioxide. Each of the succeeding effects will operate at a pressure of about 20 p.s.i.a. less than the preceding effect and at corresponding decomposition temperatures. For instance, the second effect separator column in a two effect system will generally operate at a pressure of about 20 to 60 p.s.i.a., preferably about 20 to 40 p.s.i.a., and a temperature of about 250° to 300° F., preferably 260° to 280° F.

When it is desired to remove potassium sulfate, an undesirable by product of the process, from the potassium bisulfite, a portion of the solution in line 116 can be diverted through line 144 where a centrifuge 146, or, if desired, a filter, separates the potassium sulfate crystals through discharge line 147. If a slurry of potassium bisulfite is used as feed to stripper column 122, the diversion and separation of potassium sulfate can be accomplished in line 134' or line 142.

The nature of the system and its operation is such that it is not adversely affected by the cyclic nature of plant operations, the temperature of gases to be processed (e.g. drop in temperature of power plant gases in the evening), or the sulfur or solids content of the gas, and thus provides great flexibility. Thus it can purify any gas containing $SO_2$, $SO_3$ or particulate solids or any other similar types of components in any type of gas which is compatible with the system and will not be deleteriously affected by, or deleteriously affect, the system.

The $SO_2$ recovery system described above and in the attached drawings was employed in the treatment of flue gas from a coal-burning powerplant. To evaluate the temperature drop of the incoming flue gas after being routed through the prescrubber, several runs were made at varying ratios of scrubbing water to waste gas. In each run the flue gas was introduced to the prescrubber at a flow rate of about 2,000 cubic feet per minute and at a temperature of about 300° F. The temperature and humidity of the gas as it exited the top of the impingement target was recorded. Results are presented in table I below:

TABLE I

| Run: | Flue gas inlet temp., °F. | Water flow to spray nozzle, g.p.m. | Mols of $H_2O$ per mol of dry gas | Flue gas outlet temp., °F. | Flue gas outlet humidity, percent |
|---|---|---|---|---|---|
| 1 | 300 | 0.0 | 0.060 | 300 | 6 |
| 2 | 300 | 0.1 | 0.075 | 255 | 8 |
| 3 | 300 | 0.2 | 0.085 | 215 | 12 |
| 4 | 300 | 0.3 | 0.105 | 180 | 20 |
| 5 | 300 | ----- | 0.135 | 128 | 100 |

EXAMPLE I

The following table, table II, sets forth a specific example of this process within the conditions and parameters set forth in the discussions referring to FIGS. 1 and 2 of the drawing and using essentially the same specific examples noted in the drawings, the table giving specific compositions of the streams for the various flow lines and prevailing temperatures. The flue gas has the typical composition in mole percent; sulfur dioxide, 0.3 percent; oxygen, 3.4 percent; water vapor, 6.0 percent; carbon dioxide, 14.2 percent; nitrogen, 76.1 percent; and sulfur trioxide, 0.0003 percent. Essentially no potassium sulfate is produced. The vacuum type flash cooler is operated at 1 p.s.i.a. and 104° F., water is removed from the flash cooler at a rate of about 140 pounds per hour and the pH of the solution in the crystallizer is about 7.0 to 7.2.

the gas with said metal sulfite to produce the corresponding bisulfite without entrainment of substantial amounts of said solution in the components of said gas passing upwardly from said tray and said layer of solution, spraying the undersurface

TABLE II

| Process stream | Flue gas line 12 | Into absorber 30 | Flue gas line 14 | Absorber feed line 16 | Absorber discharge line 18 | Crystal discharge blade 108 | Filtrate line 102 | Stripper column feed line 116 | Combined stripper column overhead product lines 124 and 124' | Combined stripper column product lines 131 and 131' | Stripper column bottoms line 131' | Water feed to prescrubber line 2 |
|---|---|---|---|---|---|---|---|---|---|---|---|---|
| $SO_2$, lbs./min | 0.644 | 0.644 | 0.064 | 15.03 | 15.61 | 2.49 | 13.12 | 2.49 | 0.58 | 0.58 | 1.91 | |
| $K_2S_2O_5$, lbs./min | | | | 13.25 | 15.27 | 4.25 | 11.0 | 4.25 | | | 2.25 | |
| $K_2SO_3$, lbs./min | | | | 18.21 | 16.78 | 0.09 | 16.7 | 0.09 | | | 1.51 | |
| $K_2SO_4$, lbs./min | | | | 1.77 | 1.77 | 0.27 | 1.5 | 0.27 | | | 0.27 | |
| $SO_3$, mol percent | 0.0003 | 0 | | | | | | | | | | |
| $H_2O$, lbs./min | X | | X+5.0 | 35.10 | 30.6 | 0.0 | 30.6 | 6.60 | 2.10 | 0.044 | 4.50 | 0.83 |
| Solids, lbs./min | | | | 33.23 | 33.8 | 4.61 | 29.2 | 4.61 | | | 4.03 | |
| Total lbs./min | 110 | | 114.4 | 67.33 | 64.4 | 4.61 | 59.8 | 11.21 | 2.68 | 0.624 | 8.53 | 0.83 |
| Flue gas a.c.f.m | 2,010 | | 1,550 | | | | | | | | | |
| Fly ash, grains/ft.[3] | [1] 0.3 | 0 | | | | | | | | | | |
| G.p.m | | | | 5.6 | 5.2 | | 5.0 | 0.98 | | | 0.75 | 0.10 |
| Sp. gr | | | | 1.44 | 1.48 | | 1.43 | 1.37 | | | 1.42 | 1.0 |
| Temp., ° F | 300 | 255 | 125 | 150.0 | 135 | 104 | 104 | 120 | 225 | 197.5 | 258 | 86.0 |
| pH | | | | 7.2 | 7.1 | | | | | | | |
| Relative humidity | 6% | [2] 8% | | | | | | | | | | |

[1] 1.5 grains per cubic foot into an electric precipitator and 0.3 grain out of the electric precipitator.
[2] Out of absorber zone 30, the relative humidity was 83%.

EXAMPLE II

Essentially the same procedure used in example I is followed except an aqueous solution of cesium sulfite is used instead of potassium sulfite to produce cesium bisulfite and recover $SO_2$.

EXAMPLE III

Essentially the same procedure used in example I is followed except an aqueous solution of rubidium sulfite is used instead of potassium sulfite to produce rubidium bisulfite and recover $SO_2$.

FIG. 3 is a sectional view of a design of apparatus of the present invention as described in conjunction with FIGS. 1 and 2 but for independent use in removing particulate solids or liquid soluble components in a gas stream. It also shows passage of the gas through, for the removal of large particles in, electrical precipitator 200 and the effect of prescrubber 10 is utilized on the size and part of the particulate solids which is generally more difficult to remove. Referring to FIG. 3 there is shown reactor vessel 100, comprising a cylindrical midsection 101 having circular gas inlet 105 located in the bottom quarter of the midsection and pipeline liquid spray means positioned through opening 106 and extending laterally into the midsection. It has a conical bottom portion 102 having an outlet 26 for removing liquid and particulate solid matter; and an inverted conical top portion 103 having gas outlet 104 for removing purified gas. Circular support plate 15 having a plurality of openings 107, see FIG. 4, is axially mounted in zone 20 above pipe 24 and fixedly engages internal wall 108 of midsection 101, and supports a packed column 22 composed of three layers of ceramic Raschig rings. The packed column and support plate define a gas-permeable impingement target 110. Gas inlet 105 matchingly engages gas inlet pipe 12 having a bonnet shaped end 13, extending upwardly into zone 20 below pipe 24 and is in gas communication with target 110. Spray nozzles 25 are preferably evenly spaced along internal portion 109 of pipe 24 and are mounted to spray a continuous stream of liquid, e.g. water, toward, and in liquid communication with, target 110.

It is claimed:

1. A process for separating sulfur dioxide from a sulfur-dioxide-containing gas having an elevated temperature by reaction with an aqueous solution containing dissolved metal sulfite having a concentration close to its saturation point to produce the corresponding bisulfite in a reaction zone including at least one fluid permeable, open, liquid holdup-type contact tray, comprising providing a layer of said sulfite solution on said tray, conducting said gas upwardly in the reaction zone and through said tray and said layer to react sulfur dioxide of the gas with said metal sulfite to produce the corresponding bisulfite without entrainment of substantial amounts of said solution in the components of said gas passing upwardly from said tray and said layer of solution, spraying the undersurface of said tray in the area through which said gas passes through said tray with an aqueous solution containing said metal sulfite, the amount of said solution so sprayed being sufficient to substantially maintain salt contacting the surface of said tray in solution and alleviate plugging of said tray.

2. The process of claim 1 wherein the metal sulfite solution is substantially saturated and is sprayed against substantially the entire undersurface of said tray at a rate of about 0.1 to 0.4 g.p.m. per 2,000 c.f.m. of gas.

3. The process of claim 1 wherein about 5 to 25 percent of said solution containing metal sulfite fed to the reaction zone is provided by said spraying.

4. A process for separating sulfur dioxide from a sulfur-dioxide-containing gas having a temperature of about 150° to 400° F., by reaction with an aqueous solution containing dissolved metal sulfite having a concentration close to its saturation point to produce the corresponding bisulfite in a reaction zone including at least one fluid permeable, open, liquid holdup-type contact tray, comprising providing a layer of said sulfite solution on said tray, passing solution from said layer downwardly from said tray, conducting said gas upwardly in the reaction zone and through said tray and said layer to react sulfur dioxide of the gas with said metal sulfite to produce the corresponding bisulfite without entrainment of substantial amounts of said solution in the components of said gas passing upwardly from said tray and said layer of solution, spraying the undersurface of said tray in the area through which said gas passes through said tray with an aqueous solution containing said dissolved metal sulfite, the amount of said solution so sprayed being sufficient to substantially maintain salt contacting the surface of said tray in solution and alleviate plugging of said tray, removing said metal bisulfite from the reaction zone, heating said removed metal bisulfite which may be present in the form of pyrosulfite, to produce sulfur dioxide.

5. The process of claim 4 wherein the rate of flow of the solution of metal sulfite through the reaction zone is about 0.1 to 20 g.p.m. per 2000 c.f.m. of gas, of which about 0.1 to 0.4 g.p.m. per 2,000 c.f.m. is sprayed against the undersurface of the tray.

6. The process of claim 5 wherein the superficial velocity of the gas through the reaction zone is above about 1.5 f.p.s.

7. The process of claim 5 wherein the reaction zone temperature is below about 230° F.

8. The process of claim 7 wherein the sulfite solution conducted to the reaction zone contain about 30 to 75 percent solids of which at least about 50 percent is potassium sulfite with the balance being essentially potassium bisulfite, and the aqueous solution of potassium bisulfite produced in the reaction zone contains about 40 to 75 weight percent solids of which about 5 to 60 weight percent is potassium bisulfite and the balance essentially potassium sulfite.

9. The process of claim 4 wherein the reaction zone temperature is less than about 190° F., the solution of metal sulfite contains about 40 to 65 weight percent solids of which above about 75 percent is potassium sulfite with the balance being essentially potassium bisulfite and the solution of potassium bisulfite produced in the reaction zone contains about 45 to 65 weight percent solids of which essentially 10 to 50 percent is potassium bisulfite with the balance being essentially potassium sulfite.

10. The process of claim 9 wherein the aqueous potassium sulfite solution contains a oxidation inhibitor to inhibit the reaction of sulfite ion and oxygen.

11. The process of claim 4 wherein the gaseous effluent from said layer is conducted in a generally upward direction in an entrainment zone and through a fluid-permeable, woven mesh contact material which is inert to the reactants, spraying a liquid against gas inlet and outlet sides of the contact material, the amount of the liquid so sprayed serving to maintain the material wet and remove entrained droplets in the $SO_2$-lean gas from the reaction zone.

12. The process of claim 11 wherein the liquid sprayed against said contact material is an aqueous solution of metal sulfite and, after use in the entrainment zone, is provided as a portion of the feed in the reaction zone; the rate of flow of metal sulfite solution to the reaction zone is about 0.1 to 20 g.p.m. per 2,000 c.f.m. of gas and about 40 to 60 percent of the flow is first sprayed against the contact material.

13. The process of claim 4 wherein the $SO_2$-containing gas is preliminarily scrubbed to remove sulfur trioxide in said gas and, if present, particulate solid components, comprising conducting the gas at a temperature of about 150° to 800° F. in a generally upwardly direction in a scrubbing zone to and through a substantially horizontally disposed, fluid-permeable, impingement target having a discontinuous surface for retention of entrained solids in the gas passing to the target cocurrently with said gas and aqueous liquid to contact, wet and flush the target and remove from the gas sulfur trioxide and particulate solids, if present in the gas, recovering resulting liquid from below said target, and conducting resulting purified $SO_2$-containing gas to the reaction zone.

14. The process of claim 13 wherein the gas introduced into the scrubbing zone contains from about 0.001 to less than about 5 mole percent $SO_2$, from about 0.001 to 0.01 mole percent $SO_3$, particulate solid components including from about 0.001 to 60 grains of fly ash per cubic foot of gas, and is at a temperature from about 150° to 600° F.; and the liquid used in the scrubbing zone is water and is conducted to the target in the form of a spray.

15. The process of claim 4 wherein plugging of the gas inlet to the reactor by particulate solids in the $SO_2$-containing gases is alleviated by introducing the gas into the reactor through an inlet in a sidewall of the reactor, in a generally upward direction with respect to the horizontal and into the free space of the reactor away from the inlet wall thereof, the upward direction and position of the point of introduction preventing scrubbing liquid in the reactor from contacting the upper edge of the gas inlet.

16. The process of claim 15 wherein the angle at which the gases are introduced is about 5° to 60° above the horizontal.

The process of claim 16 wherein the gases are introduced into the reactor at least one inch from the inlet wall thereof.

* * * * *